United States Patent [19]
New et al.

[11] Patent Number: 5,874,709
[45] Date of Patent: Feb. 23, 1999

[54] STRAIN RELIEF ASSEMBLY FOR WELDING CABLE

[75] Inventors: Kent Miles New; Dale Robert Bervig; William C. Foster, Jr., all of Wichita, Kans.

[73] Assignee: Tweco Products, Inc., Wichita, Kans.

[21] Appl. No.: 843,228

[22] Filed: Apr. 14, 1997

[51] Int. Cl.⁶ .................................................. B23K 9/32
[52] U.S. Cl. ...................................... 219/137.9; 439/449
[58] Field of Search ........................... 219/137.9, 137.31, 219/137.51, 137.52, 137.63; 174/135, 73.1, 75 F; 439/445, 446, 447, 448, 449, 471

[56] References Cited

U.S. PATENT DOCUMENTS

| | | |
|---|---|---|
| 1,010,529 | 12/1911 | Stevens . |
| 1,218,570 | 3/1917 | Koch ....................................... 439/448 |
| 1,266,801 | 5/1918 | Hart . |
| 1,527,236 | 2/1925 | Tidball . |
| 1,562,552 | 11/1925 | Hanley . |
| 2,101,713 | 12/1937 | Jolliffe . |
| 2,189,987 | 2/1940 | Kellems . |
| 2,436,552 | 2/1948 | Cooper . |
| 2,724,736 | 11/1955 | Klumpp, Jr. . |
| 3,265,856 | 8/1966 | Cecil . |
| 3,395,244 | 7/1968 | Koehler . |
| 3,522,578 | 8/1970 | Newman . |
| 3,610,875 | 10/1971 | Dal Molin . |
| 4,082,422 | 4/1978 | Kloots . |
| 4,158,763 | 6/1979 | Moerke . |
| 4,554,433 | 11/1985 | Toothaker ........................... 219/137.31 |
| 4,864,099 | 9/1989 | Cusick, III et al. ................ 219/137.31 |
| 5,224,874 | 7/1993 | Sell . |
| 5,338,917 | 8/1994 | Stuart et al. . |
| 5,440,100 | 8/1995 | Stuart et al. ........................ 219/137.31 |

OTHER PUBLICATIONS

Lincoln Electric; brochure entitled "200FM, 300FM & 400FM Fast–Mate Gun and Cable Assemblies"; dated Jan. 1991; 12 pages.
Tregaskiss; brochure entitled "Semi Automatic Air Cooled MIG Guns"; dated 1990; 6 pages.
Bernard; brochure entitled, "EZ Feed II MIG Guns"; undated; 6 pages.

Primary Examiner—Clifford C. Shaw
Attorney, Agent, or Firm—Senniger, Powers Leavitt & Roedel

[57] ABSTRACT

A strain relief assembly for reducing bending of a welding cable used to deliver welding wire, welding gas and electricity from a welding machine to a welding gun for welding a workpiece. The assembly includes first and second strain relief elements surrounding and extending along the welding cable for supporting and providing strain relief to the cable. The assembly also includes a connector for attaching the strain relief elements to at least one of the machine and the gun. The first strain relief element extends a first distance from the connector for supporting the cable. Thus, the first element reduces bending of a first portion of the cable positioned inside the first strain relief element. The second strain relief element extends a second distance, which is greater than the first distance, from the connector for supporting the cable and the first strain relief element. Thus, the second element reduces bending of the first portion positioned inside the first strain relief element and a second portion of the cable positioned inside the second strain relief element.

21 Claims, 6 Drawing Sheets

STRAIN RELIEF ASSEMBLY FOR WELDING CABLE

BACKGROUND OF THE INVENTION

This invention relates generally to a strain relief assembly for reducing bending of a welding cable, and more particularly, to a strain relief assembly having at least two strain relief elements for supporting the welding cable.

Gas metal arc welding ("GMAW", also known as "metal, inert-gas" welding or "MIG" welding) is used to join pieces of metal. GMAW is performed using a welding system comprising a welding machine and a welding gun joined by a welding cable. The welding machine feeds welding wire through the welding cable to the welding gun which is held adjacent a workpiece. The machine also delivers electricity to the welding gun for producing an arc between the wire and the workpiece to melt the wire into a molten pool of metal for joining the pieces of metal. In addition, the machine supplies inert welding gas to the welding gun to shield the molten pool of metal from the atmosphere. The welding cable includes electrically conductive wires for delivering electricity to the welding gun, a hose for delivering inert welding gas to the welding gun, and a conduit for delivering welding wire to the welding gun.

As the welding operator manipulates the welding gun over the workpiece, the welding cable connecting the welding gun to the welding machine bends. The cable also bends under its own weight. Because the welding machine is a stationary unit, the cable tends to bend most sharply at the end where it enters the machine. The cable also tends to bend sharply at the end adjacent the welding gun due to the movements of the operator.

When the welding cable bends, the drag between the welding wire and the inside surface of the conduit increases. If the cable is bent too sharply, the drag force on the wire will intermittently slow the wire feed rate, producing chatter, preventing smooth delivery of the welding wire to the workpiece and degrading the quality of the weld produced. If the cable is bent still more sharply, the welding wire can seize in the conduit. If the machine continues to feed wire when the wire seizes, the wire can break and cause the system to malfunction. In addition, as the cable bends, the hose delivering welding gas to the workpiece may become pinched, thereby reducing welding gas flow to the workpiece. If the gas flow rate is reduced too much, the molten metal may become exposed to the atmosphere resulting in an inferior weld. Moreover, excessive repeated bending can cause the electrical wires inside the cable to fatigue and break, causing increased electrical resistance and heat generation in the cable. If the heat generated becomes too great, the performance of the welding gun is decreased and the gun may malfunction.

In the past, strain relief assemblies have been attached to the cable where it enters the welding gun and welding machine to support the cable and reduce bending. One such strain relief comprises an elastomeric sleeve which surrounds the cable. These sleeves are generally stiff when new causing the cable to bend more sharply where it enters the sleeve, thereby defeating, at least to some extent, the purpose of the sleeves. Further, these sleeves lose their resilience over time, due to heat and fatigue, and eventually take on a permanent set which induces bending in the welding cable. Still further, these sleeves are susceptible to tearing which allows the cable to bend. Another type of previously-used strain relief assembly comprises a resilient coil spring which surrounds the cable. These springs are generally not as stiff as the elastomeric sleeves so they do not support the cable as well. Further, the springs tend to catch on surrounding objects making the cables difficult to use. Still further, the springs have a relatively large pitch (e.g., 0.250 inch) which increases their tendency to catch on surrounding objects.

SUMMARY OF THE INVENTION

Among the several objects and features of the present invention may be noted the provision of strain relief assembly which reduces bending of a welding cable; the provision of such an assembly which increases the service life of the cable; the provision of such an assembly which reduces weld wire chatter and drag in the cable; the provision of such an assembly which reduces fatigue of components forming the cable; and the provision of such an assembly which incorporates maximum stiffness in areas of maximum loading.

Briefly, apparatus of this invention is a strain relief assembly for reducing bending of a welding cable used to deliver welding wire, welding gas and electricity from a welding machine to a welding gun for welding a workpiece. The assembly comprises first and second strain relief elements surrounding and extending along the welding cable for supporting and providing strain relief to the cable. The assembly also comprises a connector for attaching the strain relief elements to at least one of the machine and the gun. The first strain relief element extends a first distance from the connector for supporting the cable. Thus, the first element reduces bending of a first portion of the cable positioned inside the first strain relief element. The second strain relief element extends a second distance, which is greater than the first distance, from the connector for supporting the cable and the first strain relief element. Thus, the second element reduces bending of the first portion positioned inside the first strain relief element and a second portion of the cable positioned inside the second strain relief element.

In another aspect of the invention, the strain relief assembly comprises a strain relief unit having a passage therethrough for receiving the welding cable. The unit is adapted for supporting and providing strain relief to the cable. The assembly also comprises a connector for attaching the strain relief unit to at least one of the machine and the gun. The strain relief unit has a first end adjacent the connector and a second opposite end spaced from the connector. The unit has a first bending stiffness in a first region extending from the first end to a position intermediate the first and second ends, and a second bending stiffness less than the first bending stiffness in a second region extending from the position intermediate the first and second ends to the second end of the unit.

In yet another aspect of the present invention, the assembly comprises a plurality of overlapping strain relief elements having different lengths surrounding and extending along the welding cable for supporting and providing strain relief to the cable. Therefore, the elements reduce bending of a portion of the cable positioned inside the elements.

Other objects and features of the invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
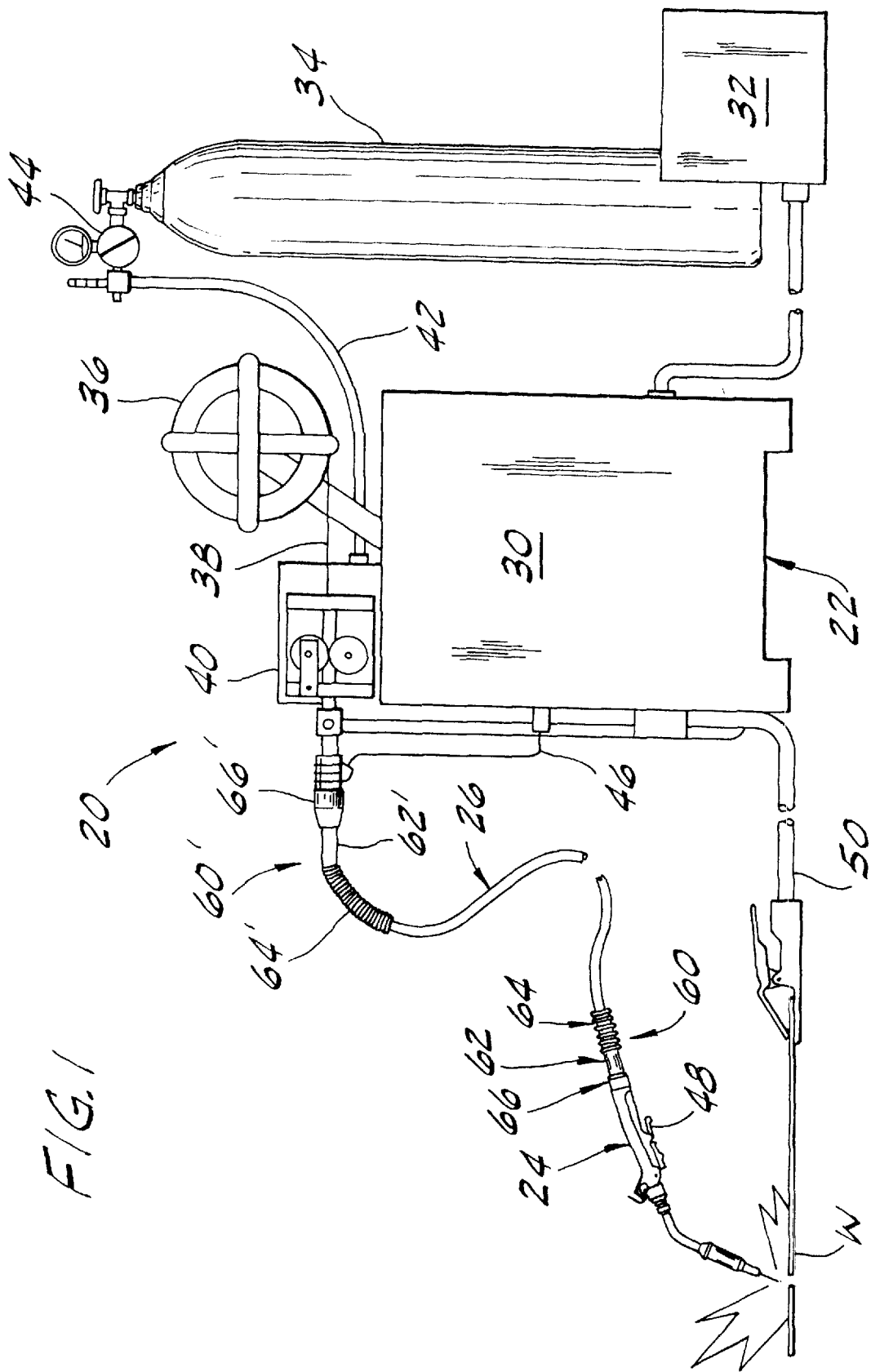
FIG. 1 is a schematic elevation of a welding machine and a welding gun connected by a welding cable having a strain relief assembly of the present invention at each end for reducing bending of the cable.

Referring now to the drawings and in particular to FIG. 1, a GMAW system is generally designated by the numeral 20. The system 20 comprises a welding machine, a welding gun and a welding cable (generally designated 22, 24 and 26, respectively) connecting the welding machine and the welding gun.

The welding machine 22 includes a welding power source 30 for converting alternating current from an external power supply 32 to direct current, a high pressure gas cylinder 34 for supplying inert welding gas, and a spool 36 of welding wire for supplying welding wire 38 to a workpiece W via the welding cable 26 and welding gun 24. The welding machine 22 also includes a wire feeder 40 which unrolls the welding wire 38 from the spool 36 and feeds it through the welding cable 26 at a generally constant rate. A high pressure hose 42 delivers welding gas from the cylinder 34 to the welding cable 26. A pressure regulator 44 mounted on the cylinder 34 controls the flow of welding gas supplied to the welding cable 26. Control wires 46, extending from the welding cable 26 to the welding machine 22, deliver a signal from the welding gun 24 to the welding machine to start and stop the supply of electricity, gas and welding wire 38 in response to actuation of a trigger 48 on the gun. A ground clamp assembly 50 completes the electrical circuit between the workpiece W and the welding machine 22 to develop an electrical arc from the tip of the welding wire 38 to the workpiece. The construction and use of the welding system 20 described above is conventional and will not be explained in further detail.

Figure 2:
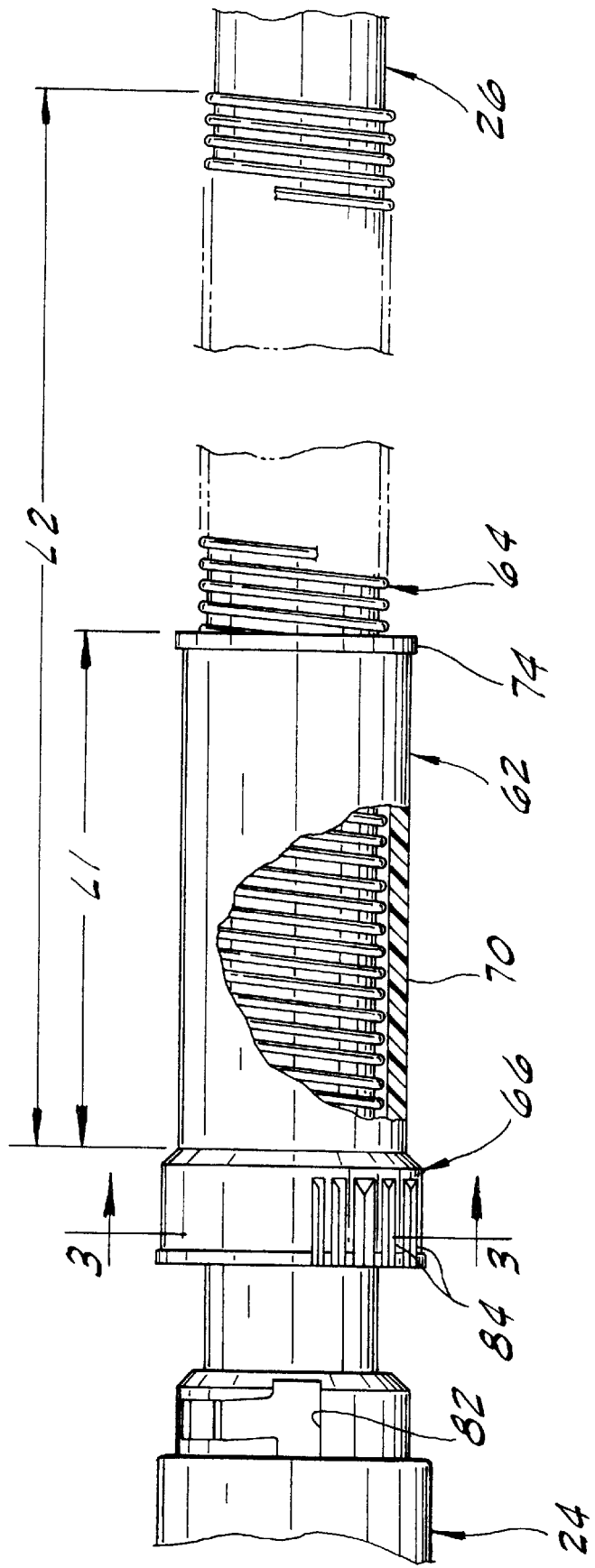
FIG. 2 is a fragmentary elevation in partial section of a first embodiment of the strain relief assembly of the present invention shown with a fragmentary elevation of a welding gun.
Figure 4:
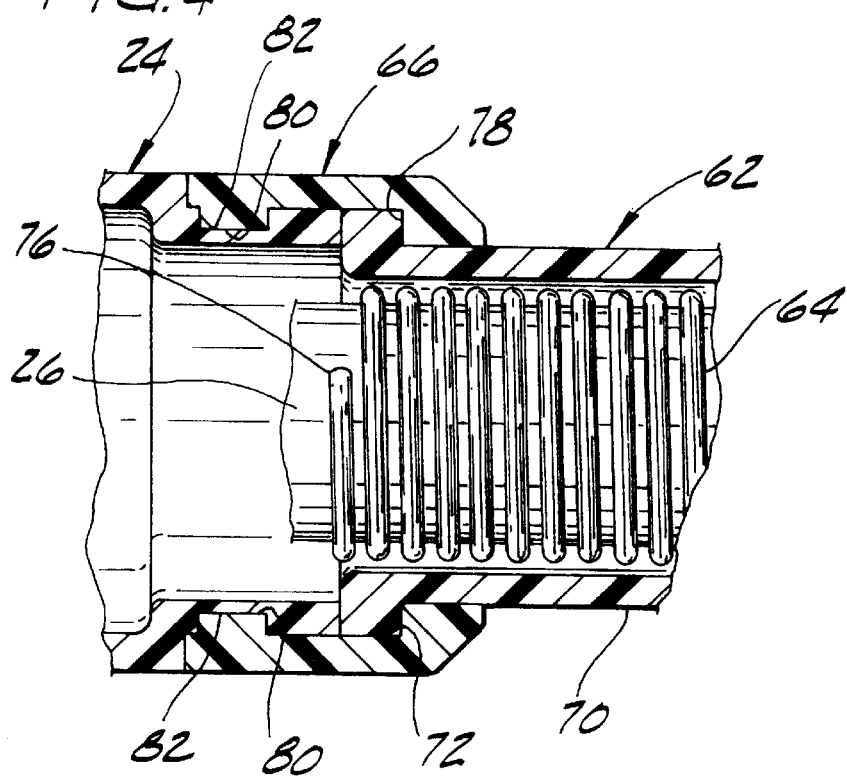
FIG. 4 is a partial fragmentary cross section of the first embodiment of the strain relief assembly taken in the plane of line 4—4 of FIG. 3.

As illustrated in FIG. 2, a first strain relief assembly, generally designated 60, is positioned adjacent the interface between the welding cable 26 and welding gun 24 for reducing bending of the welding cable. The first strain relief assembly 60 comprises an elastomeric sleeve (generally designated 62), a resilient coil spring (generally designated 64) extending generally coaxially with respect to the sleeve, and a connector (generally designated 66) for attaching the sleeve and spring to the welding gun 24. The sleeve 62 has a generally tubular body 70 with a flange 72 (FIG. 4) at one end for connecting the sleeve to the connector 66 and a rim 74 at its other end for reinforcing the sleeve to prevent it from tearing. Although other materials are envisioned as being within the scope of the present invention, the sleeve 62 of the first preferred embodiment is made of Santoprene® thermoplastic elastomer. Santoprene is a U.S. federally registered trademark of Monsanto Company of St. Louis, Mo. In addition, the sleeve 62 of the first preferred embodiment has a length of about 2.65–3.00 inches, an inside diameter of about 0.78–1.10 inch and a wall thickness of approximately 0.07–0.12 inch; however, it is envisioned that sleeves having other dimensions are also within the scope of the present invention. Further, it is envisioned that the sleeve thickness may vary along its length without departing from the scope of the present invention.

The spring 64 has a tail 76 (FIG. 3) extending tangentially from one end of the coil for engaging the end of the sleeve 62 to prevent the spring from moving away from the connector 66 through the sleeve. It is envisioned that other configurations, such as a larger diameter wind near the end of the spring, may be used to prevent the spring from moving away from the connector without departing from the scope of the present invention. Although other materials are envisioned as being within the scope of the present invention, the spring 64 of the first preferred embodiment is made of nickel-plated spring steel. The wire used in making the spring 64 of the first preferred embodiment has a diameter of about 0.07–0.08 inch. Further, the spring 64 of the first preferred embodiment has a length of about 5.37–6.00 inches, an outer diameter of about 0.84–1.04 inch, and a coil pitch of about 0.125 inches. This relatively small pitch reduces the tendency of the spring 64 to catch on surrounding objects.

Figure 3:
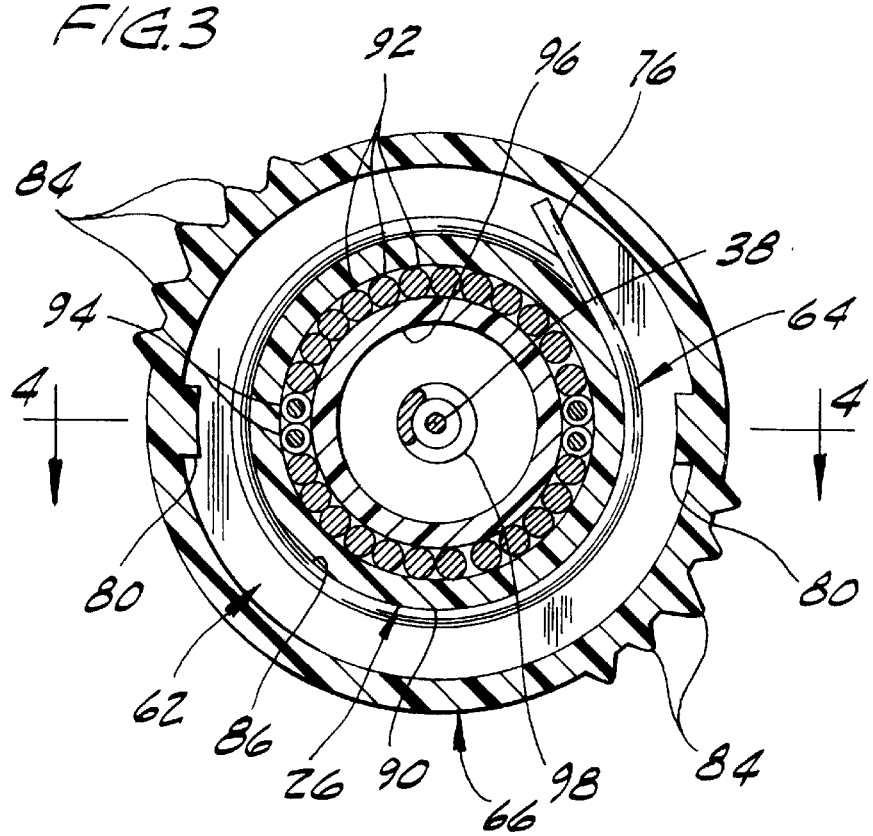
FIG. 3 is a cross section of the first embodiment of the strain relief assembly taken in the plane of line 3—3 of FIG. 2.

The connector 66 has an internal shoulder 78 (FIG. 4) for engaging the flange 72 of the sleeve 62 to attach the sleeve to the connector so the connector is freely rotatable relative to the sleeve. As illustrated in FIG. 3, the connector 66 has opposing internal lugs 80 engageable with conventional bayonet grooves 82 (FIG. 2, only one is visible) in the end of the welding gun 24 to attach the strain relief assembly to the gun. The connector 66 also has ridges 84 (FIG. 2) formed on its exterior for gripping the connector when engaging and disengaging the lugs 80 and grooves 82.

As will be apparent to those skilled in the art, the sleeve 62 and spring 64 act as a unit having a passage 86 therethrough for receiving the cable 26 to support the cable and provide strain relief to the cable. As illustrated in FIG. 2, the sleeve 62 has a length L1 extending a first distance from the connector 66 to reduce bending of a first portion of the cable positioned inside the sleeve. Likewise, the spring 64 has a length L2 extending a second distance from the connector 66 to reduce bending of a second portion of the cable positioned inside the spring. Because the sleeve 62 and spring 64 overlap in the region of the sleeve, both the sleeve and spring support the cable in this region. However, only the spring 64 supports the cable 26 in a region where the sleeve and spring do not overlap.

The loading on the cable 26 is greatest adjacent the welding gun 24. The overlapping arrangement described above provides the strain relief apparatus 60 with a greater bending stiffness in the region where the sleeve 62 and spring 64 overlap than in the region where they do not overlap. Therefore, it will be apparent to those skilled in the art that the stiffness of the apparatus 60 is greatest where the loading is greatest and less where the loading is less, so that bending in the cable 26 is reduced.

In order to understand the importance of reduced bending in the cable 26, it is necessary to understand the construction of a conventional welding cable. As illustrated in FIG. 3, the cable 26 includes an outer casing 90, which protects a plurality of twisted copper wires 92 for delivering electricity to the welding gun 24. The casing also protects four shielded control wires 94 for delivering electrical signals from the trigger 48 to the control wires 46 on the welding machine 22 to start and stop the supply of electricity, gas and welding wire 38. A hose 96 is positioned inside the wires 92, 94 for delivering inert welding gas from the welding machine 22 to the welding gun 24 to shield the molten metal from the atmosphere. In addition, a flexible conduit 98 is positioned in the interior of the hose 96 for guiding the welding wire 38 from the welding machine 22 to the welding gun 24.

When the cable 26 is bent, the drag between the welding wire 38 and the interior of the conduit 98 increases. If the drag becomes too high, the drag forces on the wire 38 will intermittently slow the wire feed rate so the wire will not feed through the cable 26 at a constant rate causing poor weld quality. Not only does the minimum radius of curvature of the cable 26 affect drag on the welding wire 38 travelling through the conduit 98, but also the total amount of curvature along the cable affects drag. By increasing the minimum radius of curvature and decreasing the total amount of curvature, drag is reduced between the welding wire 38 and conduit 98, resulting in a higher quality weld.

In addition, the wires 92, 94 inside the cable bend each time the cable 26 is bent. Eventually, the strands of the wires 92, 94 break due to fatigue caused by cyclic bending. After the wires 92 break, the electrical resistance through the wires, and therefore the heat generated by current passing through the wires, increases. Eventually, the heat will become too great and may reduce the performance of the welding gun 24 and cause the gun to malfunction. In addition, if the control wires 94 break, the welding machine 22 will not supply electricity, welding gas and welding wire to the gun 24.

Still further, as the cable 26 is bent, the hose 96 is bent which reduces the cross-sectional area of the hose and the gas flow rate through the hose. If the bend in the cable 26 is too sharp, the flow rate may become too low to shield the molten metal from the atmosphere, thereby producing an inferior weld.

In the first preferred embodiment, the length L1 is approximately 2.2 inches and the length L2 is approximately 5.2 inches. It will be apparent to those skilled in the art that the sleeve 62 and spring 64 form independent strain relief elements which act as a unit for supporting and providing strain relief to the cable 26. Not only do the sleeve 62 and spring 64 reduce bending of the cable 26, but also they act in concert to overcome disadvantages of prior art strain relief assemblies. For instance, because of the relatively close fit between the outside of the spring 64 and the inside of the sleeve 62, the spring distributes loads on the sleeve caused by the cable 26 to reduce the potential for tearing. Further, the resiliency of the spring 64 acts to remove or reduce any set which occurs in the sleeve 62 over time. Still further, the sleeve 62 covers the spring 64 to reduce the likelihood of the assembly 60 being caught on objects and hampering the operator's movements.

To further reduce the likelihood of the assembly 60 being caught, it is envisioned that the sleeve 62 could extend the entire length of the spring 64 without departing from the scope of the present invention. Likewise, it is envisioned that a jacket (not shown) may be installed over the spring 64 to reduce the likelihood of the assembly 60 being caught on surrounding objects during use.

Figure 5:
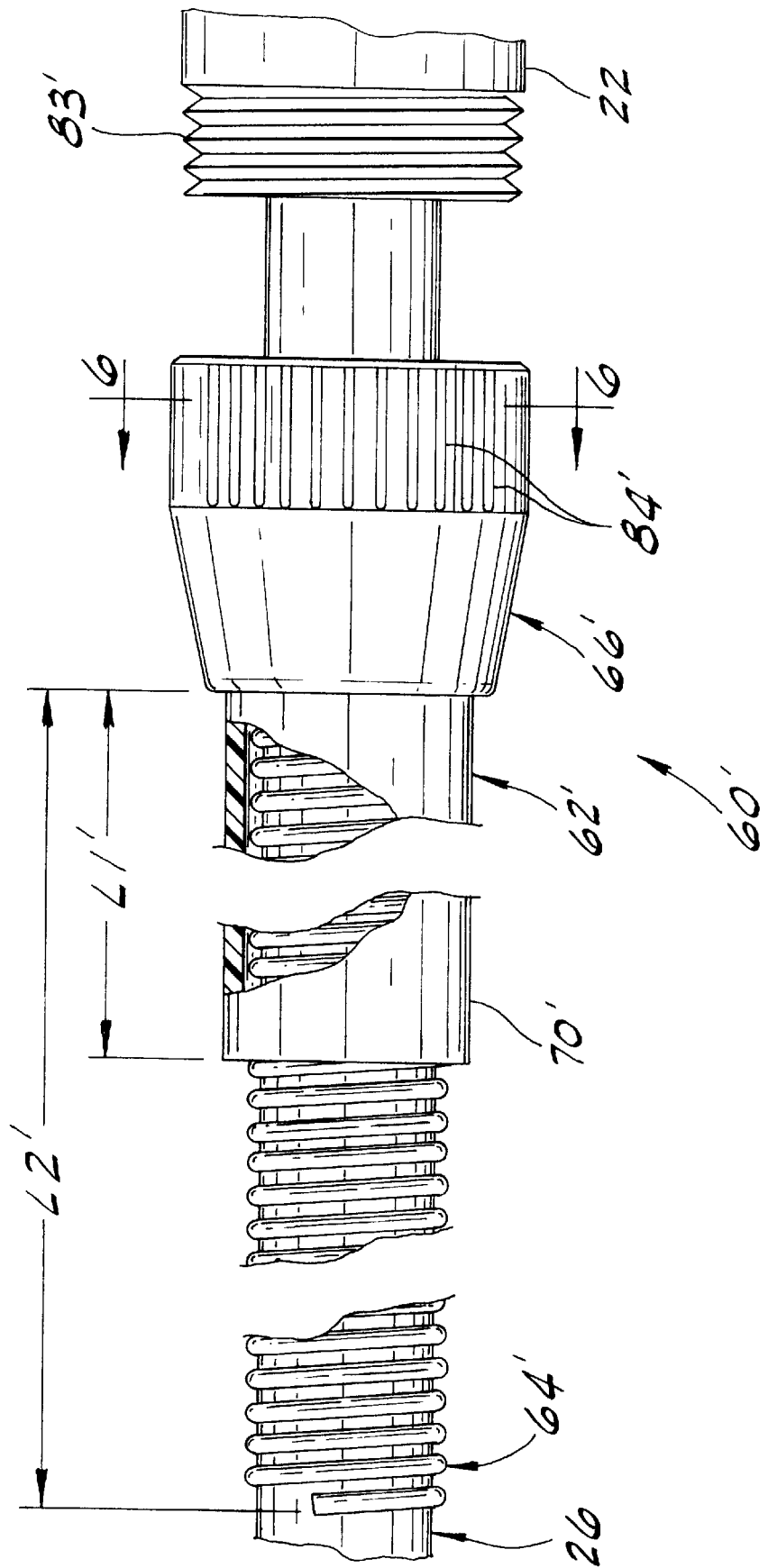
FIG. 5 is a fragmentary elevation in partial section of a second embodiment of the strain relief assembly of the present invention shown with a fragmentary elevation of a welding machine.

FIG. 5 illustrates a second embodiment of a strain relief assembly, generally designated 60', for reducing bending of the welding cable 26. This assembly 60' is positioned adjacent the interface between the welding cable 26 and welding machine 22 to reduce bending. Because the loading is greater adjacent the welding machine 22 than adjacent the welding gun 24, the dimensions of the second assembly 60' are generally larger than those of the first assembly 60. The second strain relief assembly 60' comprises an elastomeric sleeve (generally designated 62'), a resilient coil spring (generally designated 64') extending generally coaxially with respect to the sleeve, and a connector (generally designated 66') for attaching the sleeve and spring to the welding gun 24. Similar to the sleeve 62 of the first embodiment, the sleeve 62' of the second embodiment has a generally tubular body 70' with a flange 72' (FIG. 7) at one end for connecting the sleeve to the connector 66'. Although other materials are envisioned as being within the scope of the present invention, the sleeve 62' of the second preferred embodiment is made of Santoprene® thermoplastic elastomer. In addition, the sleeve 62' of the second preferred embodiment has a length of about 5.1 inches, an inside diameter of about 1.07 inch and a wall thickness of approximately 0.12 inch; however, it is envisioned that sleeves having other dimensions are also within the scope of the present invention.

Figure 6:
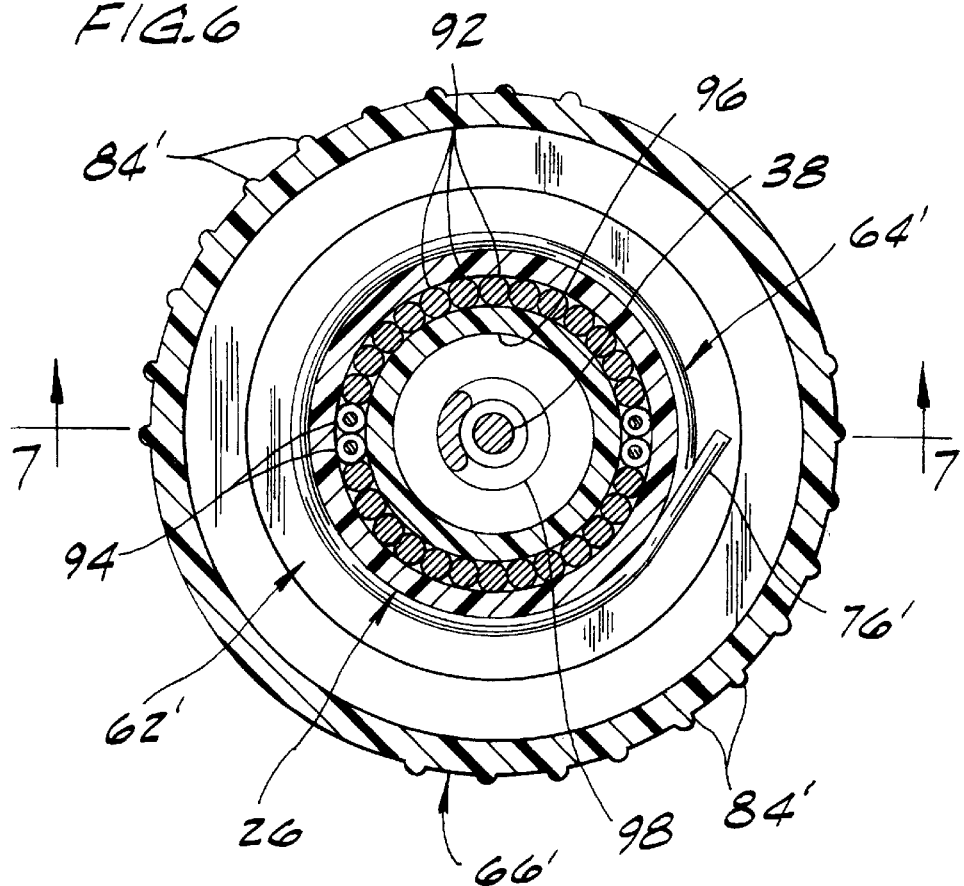
FIG. 6 is a cross section of the second embodiment of the strain relief assembly taken in the plane of line 6—6 of FIG. 5.

The spring 64' has a tail 76' (FIG. 6) extending tangentially from one end of the coil for engaging the end of the sleeve 62' to prevent the spring from moving away from the connector 66' through the sleeve. As with the spring 64 of the first embodiment, it is envisioned that other configurations, such as a larger diameter wind near the end of the spring 64' of the second embodiment, may be used to prevent the spring from moving away from the connector 66' without departing from the scope of the present invention. Although other materials are envisioned as being within the scope of the present invention, the spring 64' of the second preferred embodiment is made of nickel-plated spring steel. The wire used in making the spring 64' of the second preferred embodiment has a diameter of about 0.08–0.10 inch. Further, the spring of the first preferred embodiment has a length of about 13.75 inches, an outer diameter of about 0.99–1.04 inch, and a coil pitch of about 0.125 inches. This relatively small pitch reduces the tendency of the spring 64' to catch on surrounding objects.

Figure 7:
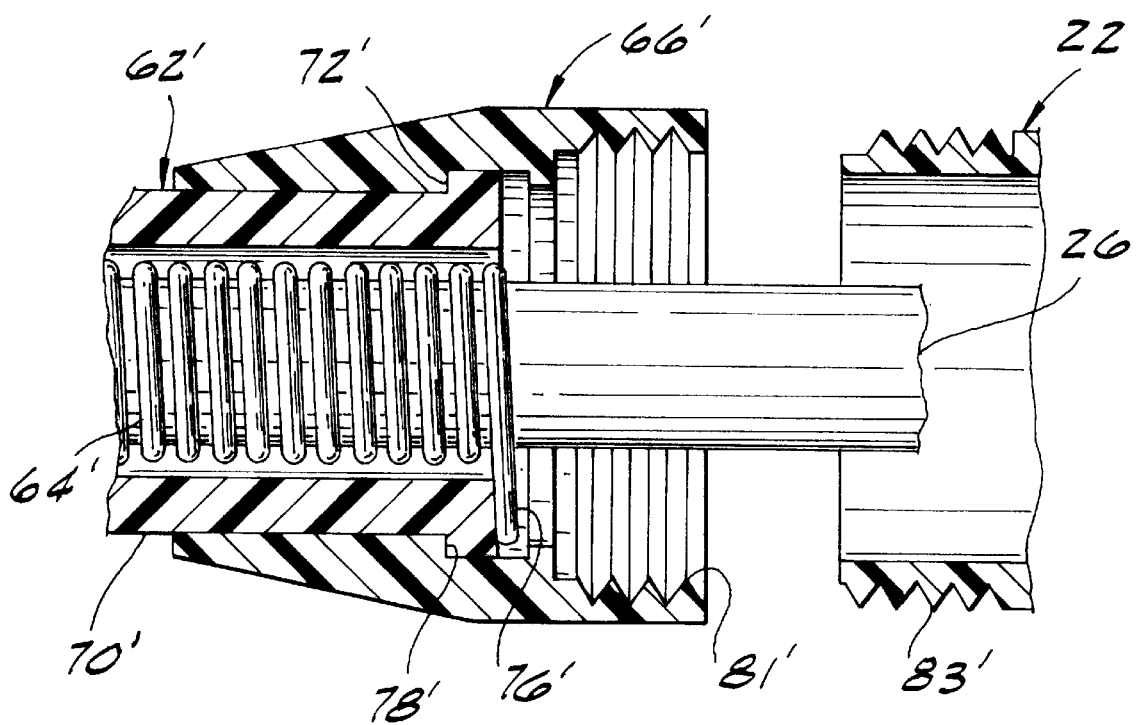
FIG. 7 is a partial fragmentary cross section of the second embodiment of the strain relief assembly taken in the plane of line 7—7 of FIG. 6.

The connector 66' has an internal shoulder 78' (FIG. 7) for engaging the flange 72' of the sleeve 62' to rotatably attach the sleeve to the connector. As illustrated in FIG. 7, the connector 66' has internal screw threads 81' for engaging screw threads 83' (FIG. 5) on the welding machine 22 to attach the strain relief assembly to the machine. The connector 66' has ridges 84' (FIG. 5) formed on its exterior for gripping the connector when engaging and disengaging the screw threads 81' with threads 83'.

In the second preferred embodiment, the length L1' is approximately 4.0 inches and the length L2' is approximately 12.0–15.0 inches. As will be apparent to those of skilled in the art, the assembly 60' of the second embodiment is used in the same way as the assembly 60 of the first embodiment, and produces the same beneficial results. To further reduce the likelihood of the assembly 60' being caught on surrounding objects, it is envisioned that the sleeve 62' could extend the entire length of the spring 64' without departing from the scope of the present invention. Likewise, it is envisioned that a jacket (not shown) may be installed over the spring 64' to reduce the likelihood of the assembly 60' being caught during use.

Figure 8:
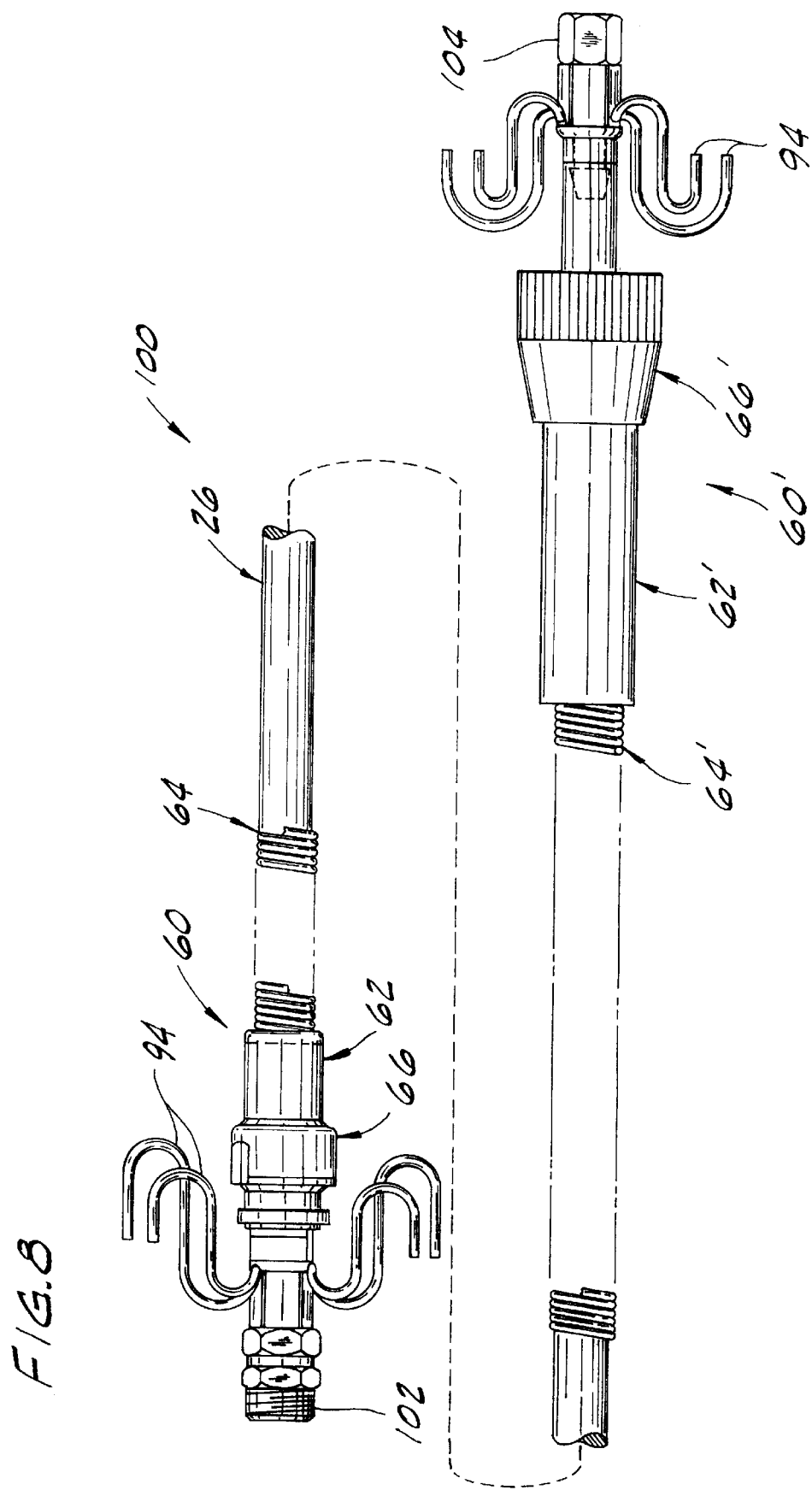
FIG. 8 is an elevation of a welding cable assembly having the first and second embodiments of the strain relief assembly of the present invention at opposite ends for reducing bending of the cable.

A cable assembly, generally designated 100, is illustrated in FIG. 8. The cable assembly 100 comprises a cable 26 having a strain relief assembly 60 of the first embodiment adjacent a first end and a strain relief assembly 60' of the second embodiment adjacent a second end. The cable assembly 100 also includes conventional male and female connectors 102, 104, respectively, for connecting the hose 96 to the welding gun 24 and welding machine 22. Conventional electrical connectors (not shown) may be used to connect the control wires 94 to the welding gun 24 and machine 22. The conduit 98 and wires 92 are not visible in FIG. 8.

It is envisioned that the connectors 66, 66' may be omitted from alternate embodiments (not shown) of the strain relief assemblies. In these embodiments, the corresponding strain relief elements may be captured by portions of the welding gun 24 and welding machine 22.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A strain relief assembly for reducing bending of a welding cable used to deliver welding wire, welding gas and electricity from a welding machine to a welding gun for welding a workpiece, the assembly comprising:

first and second strain relief elements surrounding and extending along said welding cable for supporting and providing strain relief to the cable; and a connector for attaching said first and second strain relief elements to at least one of the machine and the gun;

said first strain relief element extending a first distance from the connector for supporting the cable thereby to reduce bending of a first portion of the cable positioned inside said first strain relief element, and said second strain relief element extending a second distance greater than said first distance from the connector for supporting the cable and said first strain relief element thereby to reduce bending of said first portion positioned inside said first strain relief element and a second portion of the cable positioned inside said second strain relief element.

2. A strain relief assembly as set forth in claim 1 wherein said first strain relief element comprises an elastomeric sleeve and said second strain relief element comprises a resilient coil spring extending generally coaxially with respect to the sleeve.

3. A strain relief assembly as set forth in claim 2 wherein the sleeve surrounds the coil spring.

4. A strain relief assembly as set forth in claim 3 wherein the sleeve has an inside diameter only slightly greater than an outside diameter of the spring so that the spring has a close fit inside the sleeve.

5. A strain relief assembly as set forth in claim 3 wherein the connector is adapted for attaching the strain relief assembly to the welding gun and said second distance is at least two times longer than said first distance.

6. A strain relief assembly as set forth in claim 5 wherein said second distance is between two and three times longer than said first distance.

7. A strain relief assembly as set forth in claim 3 wherein the connector is adapted for attaching the strain relief assembly to the welding machine and said second distance is at least two times longer than said first distance.

8. A strain relief assembly as set forth in claim 7 wherein said second distance is between three and five times longer than said first distance.

9. A strain relief assembly as set forth in claim 1 wherein said first strain relief element has a substantially continuous and uninterrupted exterior surface.

10. A strain relief assembly for reducing bending of a welding cable used to deliver welding wire, welding gas and electricity from a welding machine to a welding gun for welding a workpiece, the assembly comprising:

a strain relief unit having a passage therethrough for receiving said welding cable, said unit being adapted for supporting and providing strain relief to the cable; and a connector for attaching the strain relief unit to at least one of the machine and the gun;

said strain relief unit having a first end adjacent the connector and a second opposite end spaced from the connector, the unit having a first bending stiffness in a first region extending from said first end to a position intermediate said first and second ends and a second bending stiffness less than said first bending stiffness in a second region extending from the position intermediate said first and second ends to said second end of the unit.

11. A strain relief assembly as set forth in claim 10 wherein the connector is adapted for attaching the strain relief assembly to the welding gun and said second region is at least as long as said first region.

12. A strain relief assembly as set forth in claim 11 wherein said second region is between one and two times as long as said first region.

13. A strain relief assembly as set forth in claim 10 wherein the connector is adapted for attaching the strain relief assembly to the welding machine and said second region is at least as long as said first region.

14. A strain relief assembly as set forth in claim 13 wherein said second region is between two and four times longer than said first region.

15. A strain relief assembly as set forth in claim 10 wherein the strain relief unit comprises:

a first strain relief element surrounding the cable and extending from said first end of the strain relief unit to the position intermediate said first and second ends of the strain relief unit; and a second strain relief element surrounding the cable and extending from said first end of the strain relief unit to said second end of the strain relief unit.

16. A strain relief assembly as set forth in claim 15 wherein said first strain relief element comprises a elastomeric sleeve and said second strain relief element comprises a resilient coil spring.

17. A strain relief assembly as set forth in claim 14 wherein the sleeve surrounds the coil spring.

18. A strain relief assembly as set forth in claim 10 wherein said first region of the assembly has a substantially continuous and uninterrupted exterior surface.

19. A strain relief assembly for reducing bending of a welding cable used to deliver welding wire, welding gas and electricity from a welding machine to a welding gun for welding a workpiece, the assembly comprising a plurality of overlapping strain relief elements having different lengths surrounding and extending along said welding cable for supporting and providing strain relief to the cable thereby to reduce bending of a portion of the cable positioned inside said plurality of elements.

20. A strain relief assembly as set forth in claim 19 further comprising a connector for attaching said plurality of strain relief elements to at least one of the machine and the gun.

21. A strain relief assembly as set forth in claim 19 wherein an outermost strain relief element of said plurality of overlapping strain relief elements has a substantially continuous and uninterrupted exterior surface.

\* \* \* \* \*